United States Patent [19]
Crowell et al.

[11] Patent Number: 5,666,328
[45] Date of Patent: Sep. 9, 1997

[54] THREE AXIS SEISMIC VIBRATOR

[75] Inventors: John Mark Crowell, Friendswood; Rhys Michael Evans, Houston; James Edward Teske, Santa Fe, all of Tex.

[73] Assignee: I/O Exploration Products (U.S.A.), Inc., Stafford, Tex.

[21] Appl. No.: 733,495

[22] Filed: Oct. 18, 1996

[51] Int. Cl.$^6$ .................... H04R 11/00; G01V 1/02
[52] U.S. Cl. ............... 367/189; 181/113; 181/121; 367/75
[58] Field of Search ................. 367/189, 190, 367/75; 181/113, 114, 121

[56] References Cited

U.S. PATENT DOCUMENTS

| | | | |
|---|---|---|---|
| 3,143,181 | 8/1964 | Bays et al. | 367/189 |
| 3,306,391 | 2/1967 | Bays | 181/114 |
| 3,745,885 | 7/1973 | Fair et al. | 367/189 |
| 3,777,843 | 12/1973 | Fair et al. | 181/114 |
| 4,114,722 | 9/1978 | Weber et al. | 181/114 |
| 4,321,981 | 3/1982 | Waters | 181/119 |
| 4,655,314 | 4/1987 | Airhart | 181/113 |
| 4,660,674 | 4/1987 | Airhart | 181/113 |
| 4,660,675 | 4/1987 | Airhart | 181/113 |
| 4,662,473 | 5/1987 | Betz | 181/113 |
| 4,664,222 | 5/1987 | Jones et al. | 181/113 |
| 4,709,362 | 11/1987 | Cole | 367/189 |
| 4,718,049 | 1/1988 | Crowell et al. | 367/189 |
| 4,719,607 | 1/1988 | Airhart | 367/189 |
| 4,735,280 | 4/1988 | Cole | 181/113 |
| 4,785,430 | 11/1988 | Cole | 367/189 |
| 4,785,431 | 11/1988 | Myers | 367/189 |
| 4,805,725 | 2/1989 | Paulsson | 181/106 |
| 4,848,512 | 7/1989 | Airhart | 181/114 |
| 4,853,907 | 8/1989 | Bays | 367/189 |
| 4,867,096 | 9/1989 | Cole | 181/114 |
| 4,922,473 | 5/1990 | Sallas et al. | 367/189 |
| 4,980,874 | 12/1990 | Justice, Jr. | 367/190 |
| 5,187,331 | 2/1993 | Sakata | 181/121 |
| 5,252,785 | 10/1993 | Christensen | 181/113 |
| 5,396,029 | 3/1995 | Talke | 181/114 |
| 5,401,919 | 3/1995 | Crowell et al. | 181/121 |

*Primary Examiner*—J. Woodrow Eldred
*Attorney, Agent, or Firm*—Haynes and Boone, L.L.P.; Tim Headley; John Moetteli

[57] ABSTRACT

A three-axis seismic vibrator is provided which imparts compressional and shear wave seismic vibrations, either sequentially or simultaneously, into the Earth's surface. The seismic vibrator includes an earth-contacting baseplate which transmits vibrational energy into the Earth's surface; a support structure; a vibrator assembly pivotally supported at one end by the support structure; and servo-hydraulic control circuits which activate reciprocal vibration along the vibratory axis of the vibrator assembly and sustained oscillatory vibration of the vibrator assembly. The vibrations thus generated are transferred to the baseplate and injected into the Earth's surface. These vibrations and their reflections can then be recorded and analyzed to determine the mineral content of the Earth's surface in the immediate area.

12 Claims, 6 Drawing Sheets

THREE AXIS SEISMIC VIBRATOR

BACKGROUND OF THE INVENTION

The present invention relates to vibrators used in seismic exploration, and, in particular, to a system and method for seismic exploration utilizing a hydraulically actuated three-axis vibrator.

Seismic exploration typically involves the introduction of shock waves, or vibrations, into a geologic formation. The reflected portion of shock waves passing through differing strata in the formation are then monitored. The reflected shock waves are used to estimate the shape, composition, and depth of various strata within a formation. The predominant method of inducing these vibrations is by hydraulic actuators of a variety of forms. U.S. Pat. No. 5,401,919 to Crowell et al., the contents of which are incorporated by reference, describes one such form for generating compression waves.

Patents illustrating three-axis-capable seismic vibrators include U.S. Pat. No. 4,662,473 to Betz; U.S. Pat. No. 4,665,314 issued to Airhart; U.S. Pat. No. 4,660,675 issued to Airhart; U.S. Pat. No. 4,719,607 issued to Airhart. Each of these patents illustrates an apparatus capable of producing vibratory seismic waves at varying inclinations and azimuths without repositioning the ground engaging base plate of the apparatus or without repositioning the vehicle which carries such apparatus. However, these prior art devices require repositioning or reconfiguration of some component, for example, the vibratory mass, in order to generate both orthogonal shear waves and compression waves. Additionally, these devices can not produce shear waves without also generating a significant compression wave at the same time.

U.S. Pat. No. 4,853,907 describes an inclinable seismic vibrator. The apparatus provides a means "for imparting vibratory signals to the earth along selected vector paths." The apparatus is mountable to a vehicle frame and includes a ground-engaging base plate 18 which connects to a lower lift frame 14. Col. 3, lines 64–65. The vibrator 34 includes a universal joint 38 which connects a shaft 36 to the base plate 18. Col. 4, lines 18–22. A vibratory mass 44 mounts on the shaft 36, and reciprocates the shaft to impart vibrations into the baseplate 18. Col. 4, lines 30–31.

The prior art does not provide a device for generating seismic vibrations along three axes simultaneously, nor can it selectively impart shear wave only. Therefore, what is needed is a seismic vibrator which simultaneously or selectively imparts compression waves (P-waves) and orthogonal shear waves (S1- and S2-waves) into the Earth's surface. In addition, what is needed is a system and method which more precisely, and in a more shock-isolating arrangement, controls the inclination and the azimuth of the seismic source.

Another prior art P-wave isolation scheme uses vertical chains to maintain the baseplate and a foot in a proper orientation when the baseplate is in an up and stored position. In addition, isolation air bags act vertically while an assortment of restraining linkages rigidly restrain the vibrator against transverse motion. However, in combined P-wave and S-wave operation, rigid transverse restraint would permit a large portion of the S-wave energy to transfer to the vehicle. Therefore, to produce S-waves and provide for greater shock isolation, the output energy which transfers to the vehicle must be minimized. At the same time, the selection of a transverse restraint system having an excessively weak restraint would limit the seismic vibrator to operation on terrain which is level and flat. This is because use on a slope or incline would permit the vibrator to move laterally into the vehicle frame during operation.

The solution to the above-identified problem, which is inherent in a three-axis vibratory system, is not addressed in the prior art. Therefore, what is needed is a vibration isolation scheme which provides an appropriate compliant restraint of the seismic vibrator evenly along multiple axes.

SUMMARY OF THE INVENTION

The present invention, accordingly, provides a three-axis seismic vibrator, an isolation system for such vibrator, and a method which imparts three-axis seismic vibrations, being compression and shear waves, either sequentially or simultaneously, into the Earth's surface.

The seismic vibrator includes an earth-contacting baseplate which transmits vibrational energy into the Earth's surface. A support structure has a pivot assembly which includes a ball received within a socket assembly. Stilt legs rigidly connect the baseplate to the support structure in a spaced relationship. The pivot assembly pivotally supports a vibrator assembly. The vibrator assembly includes a reaction mass, a double-acting cylinder, and a P-wave piston shaft. The piston shaft has a first and second end and a middle portion which connects between the first and second end. The piston mounts on the piston shaft and within a cavity in the reaction mass. The first end of the piston shaft connects to the ball. A first servo-hydraulic control circuit imparts a linear reciprocating vibration to the reaction mass back and forth along the axis of the piston shaft. The reciprocating vibration occurs along a substantially vertical ands when the seismic vibrator is in a preferred, upright and level, operating position. The reciprocating vibration transfers through the pivot assembly, into the support structure, down the stilt legs, into the baseplate, and then into the Earth's surface. A second servo-hydraulic control circuit imparts a first oscillatory vibration to the piston shaft, and thus also to the reaction mass. The oscillatory vibration transfers through the second end of the piston shaft, into the baseplate, and then into the Earth's surface.

In another feature of the invention, a third servo-hydraulic control circuit activates a second oscillatory vibration in the second end of the piston shaft, thus imparting a second sustained oscillatory vibration which is substantially orthogonal to that of the first oscfilatory vibration.

In another feature of the invention, the second control circuit includes at least one actuating cylinder which is in mating, non-sliding engagement with the second end of the piston shaft.

In another feature of the invention, the second control circuit imparts sustained oscillatory vibrations to the second end of the piston shaft. When the seismic vibrator is in a preferred operating position, the oscillatory vibrations follow a substantially circular path having an axis which is substantially collinear with the Earth's center and the center of the ball, thus generating substantially equal orthogonal shear wave vibrations.

In another feature of the invention, the second and third control circuits cooperate together, each including an opposed, horizontally-mounted, single-acting, servo-hydraulic, actuating cylinder pair which slidably engages a yoke. The second end of the piston shaft mounts into the yoke. The actuating cylinders of the actuating cylinder pair are in mating, sliding engagement with the yoke and thus control its movement. Control of the yoke controls the movement of the second end of the piston shaft. The second and third servo-hydraulic control circuits work together to impart sustained oscillatory vibration to the second end of the piston shaft. Preferably, this oscillatory vibration follows a substantially circular path having an axis which is substantially collinear with the Earth's center and the center of the ball. This combined oscfilatory vibration generates equal orthogonal S-wave vibrations when the seismic vibrator is in the upright and level operating position.

In another feature of the invention, the second control circuit includes an opposed, horizontally-mounted, single-acting, servo-hydraulic, actuating cylinder pair which engages a yoke. The second end of the piston shaft mounts into the yoke. The actuating cylinders of the actuating cylinder pair are in mating, non-sliding engagement with the yoke, and thus with the second end of the piston shaft of the vibrator assembly.

In another feature of the invention, the second control circuit includes at least one opposed, horizontally-mounted, single-acting, servo-hydraulic, actuating cylinder pair. The actuating cylinders mount to the baseplate and engage a yoke. The yoke mounts over the second end of the piston shaft, thus enabling the actuating cylinders to oscillate the reaction mass.

In another feature of the invention, the second and third control circuits selectively actuate and control two opposed, horizontally-mounted, single-acting, servo-hydraulic, actuating cylinder pairs, each pair having a position orthogonal with respect to the other pair.

In another feature of the invention, a method is provided which imparts combined compressional and shear wave seismic vibrations into the Earth's surface. The method includes the steps of (a) creating substantially vertical vibrations in a reaction mass; (b) creating substantially horizontal, oscillatory vibrations of the reaction mass; and (c) transmitting the vibrations into the Earth's surface.

An advantage achieved with the present invention is that it enables the generation of compression waves and both types of shear waves in one setup, thus eliminating the need to reconfigure the seismic vibrator in order to generate all three vibrations at the same time, or selectively sequentially.

Another advantage achieved with the present invention is that it enables the selection of the type of seismic wave to transfer into the Earth's surface. This is important as there are cases in which only one or two of the three types of seismic waves is desired. For example, when it is required to generate compression waves, then followed by shear waves in either orthogonal direction.

DESCRIPTION OF THE PREFERRED EMBODIMENTS

Figure 1:
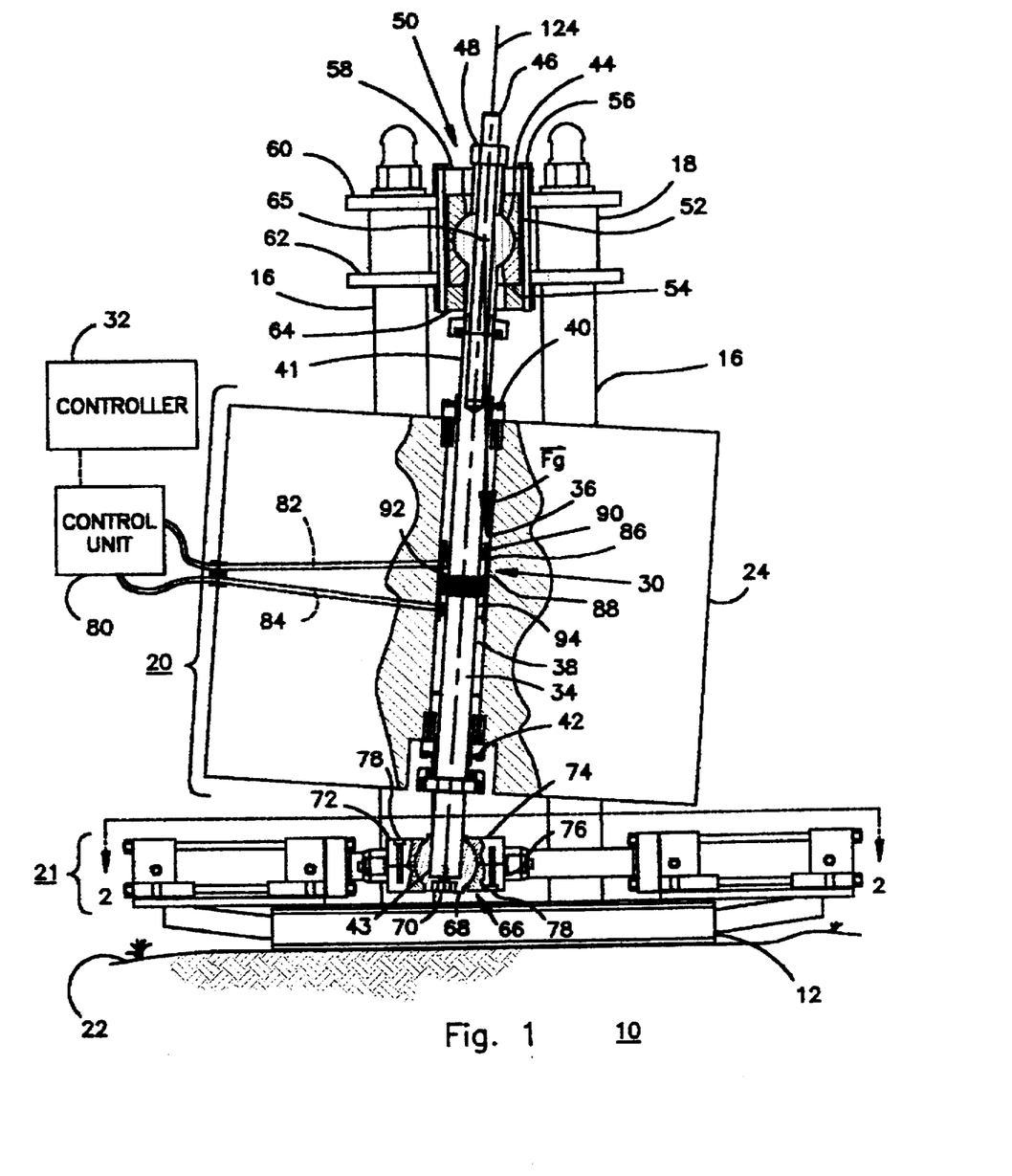
FIG. 1 is a side view of the preferred embodiment of the present invention.

Referring to FIG. 1, a seismic vibrator 10 includes an earth-contacting baseplate 12, stilt legs 16, a top cross 18, a vibrator assembly 20, and a control mechanism 21. The baseplate 12 is in contact with the Earth's surface 22. The stilt legs 16 rigidly connect the top cross 18 to the baseplate 12 in a spaced relationship. The vibrator assembly 20 includes a reaction mass 24, a double-acting, servo-hydraulic, actuating cylinder 30, a hydraulic controller 32 and a P-wave piston shaft 34. The double-acting cylinder 30 is disposed within the reaction mass 24. The piston shaft 34 slidably mounts on bushings 36 and 38, which are held in place with retainer caps 40 and 42, respectively.

The piston shaft 34 has a top end 41 and a bottom end 43. A ball 44 fastens onto the top end 41 via a stud 46 and a nut 48. A socket assembly 50 includes a top yoke portion 52, and a bottom yoke portion 54, which together hold the ball 44. Fasteners 56 pass through a top clamping plate 58, top and bottom top cross flanges 60 and 62, and a bottom clamping plate 64. The socket assembly 50 restrains the ball 44, while enabling the ball to freely pivot about its center 65.

The socket assembly 50 connects to the top cross 18 at a distance from the baseplate 12 which is of a magnitude sufficient to keep the vibrator assembly 20 from coming in contact with the baseplate 12. The ball 44 and the socket assembly 50 together form a pivot assembly which pivotally supports the vibrator assembly 20. A yoke assembly 66 supports the bottom end 43 of the piston shaft 34. The yoke assembly 66 includes a ball 68 and a socket 72. The ball 68 fastens to the piston shaft 34 via a fastener 70. The socket 72 has a top yoke portion 74 and a bottom yoke portion 76, which hold the ball 68. Fasteners 78 join the portions 74 and 76.

The hydraulic controller 32 connects to a servo-hydraulic control circuit 80. The control circuit 80 includes the double-acting cylinder 30, two dual-supply/exhaust charmels 82 and 84, which are built within the reaction mass 24, and which connect pressure and exhaust lines to the double-acting cylinder 30, a controllable hydraulic switch (not shown), a fluid reservoir (not shown) and a hydraulic pump (not shown). The double-acting cylinder 30 includes a removable bore liner 86, a P-wave piston 88 which mounts on the piston shaft 34, and a retainer 90. The removable bore liner 86 has an interior chamber within which the piston 88 fits and is free to reciprocate. The piston 88 divides the interior chamber into an upper compartment 92 and a lower compartment 94. The dual-supply/exhaust channel 82 connects to the upper compartment 92. The dual-supply/exhaust channel 84 connects to the lower compartment 94.

Figure 2:
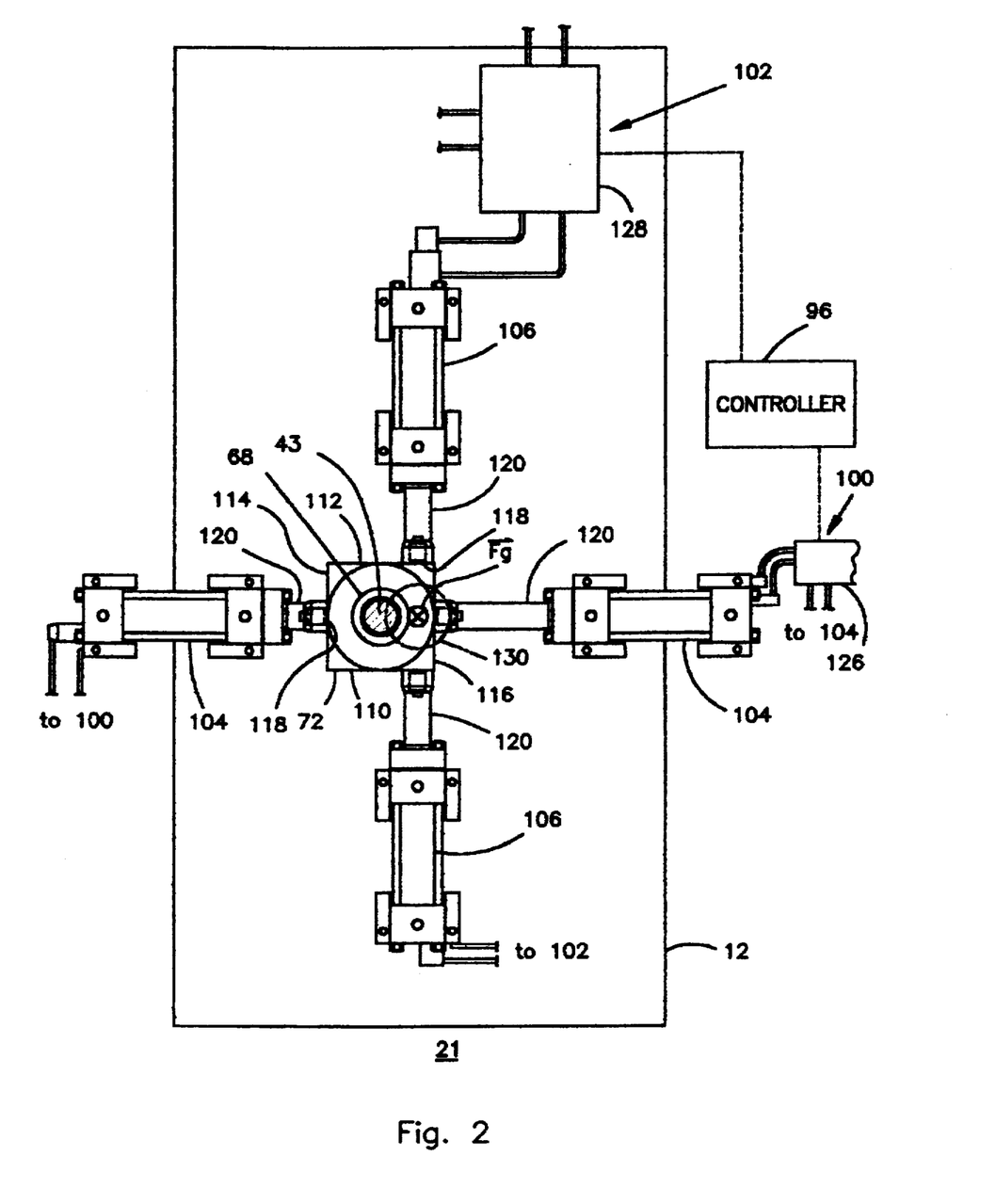
FIG. 2 is a top view of a section of the invention of FIG. 1, taken along the line B—B at time T1.

Now referring to FIG. 2, the position of the control mechanism 21 at a time T1 is depicted. The control mechanism 21 includes a hydraulic controller 96, control circuits 100 and 102, and the yoke assembly 66 (shown in FIG. 1). The control circuits 100 and 102 connect to the hydraulic controller 96. Each control circuit 100 and 102 includes a horizontally-mounted, single-acting, actuating cylinder pair 104 and 106, respectively. The actuating cylinder pairs 104 and 106 affix to the baseplate 12 orthogonally with respect to each other. The socket 72 has sides 110, 112, 114, and 116 which are flat, smooth sliding surfaces. Each actuating cylinder pair 104 and 106 are engagable against opposite sides 110 and 112, or 114 and 116, through corresponding sliding surfaces 118 on actuation pistons 120.

Because the top end 41 pivotally mounts within the socket assembly 50, the bottom end 43 is freely relocatable by the actuating cylinder pairs 104 and 106. The ball 68 and thus also the socket 72 are free to move with respect to the baseplate 12. Although the ball 68 fastens to the piston shaft 34, the socket 72 is free to pivot on the ball 68. This arrangement allows the socket 72 to maintain an orientation which is parallel to the plane of actuation of the cylinders of the actuating cylinder pairs 104 and 106. Because the yoke assembly 66 connects to the end of the piston shaft 34, surfaces 118 slide vertically as well as horizontally relative to the sides 110, 112, 114, and 116.

In either P-wave or S-wave operation, a preferred position of the seismic vibrator 10 is with the baseplate 12 lying flat and level on the Earth's surface 22, and the stilt legs 16 extending upward, opposing a gravity gradient vector Fg. In this position, the oscillation of the bottom end 43 of the vibrator assembly 20 occurs along a substantially circular path 130 having an axis which is substantially collinear with the Earth's center (not shown) and the center 65 of the ball 44.

Referring now to FIG. 1, in P-wave operation, the hydraulic controller 32 controls the timing and manner of actuation of the control circuit 80. The hydraulic controller 32 imparts linear reciprocating vibration in the reaction mass 24 along the axis 124 of the piston shaft 34. The reciprocating vibration occurs along a substantially vertical axis when the seismic vibrator is in the preferred, upright and level, operating position. The P-wave energy thus generated transmits through the top cross 18, down the stilt legs 16, and into the baseplate 12. The baseplate 12 then sends the vibrational energy into the Earth's surface 22.

Figure 3:
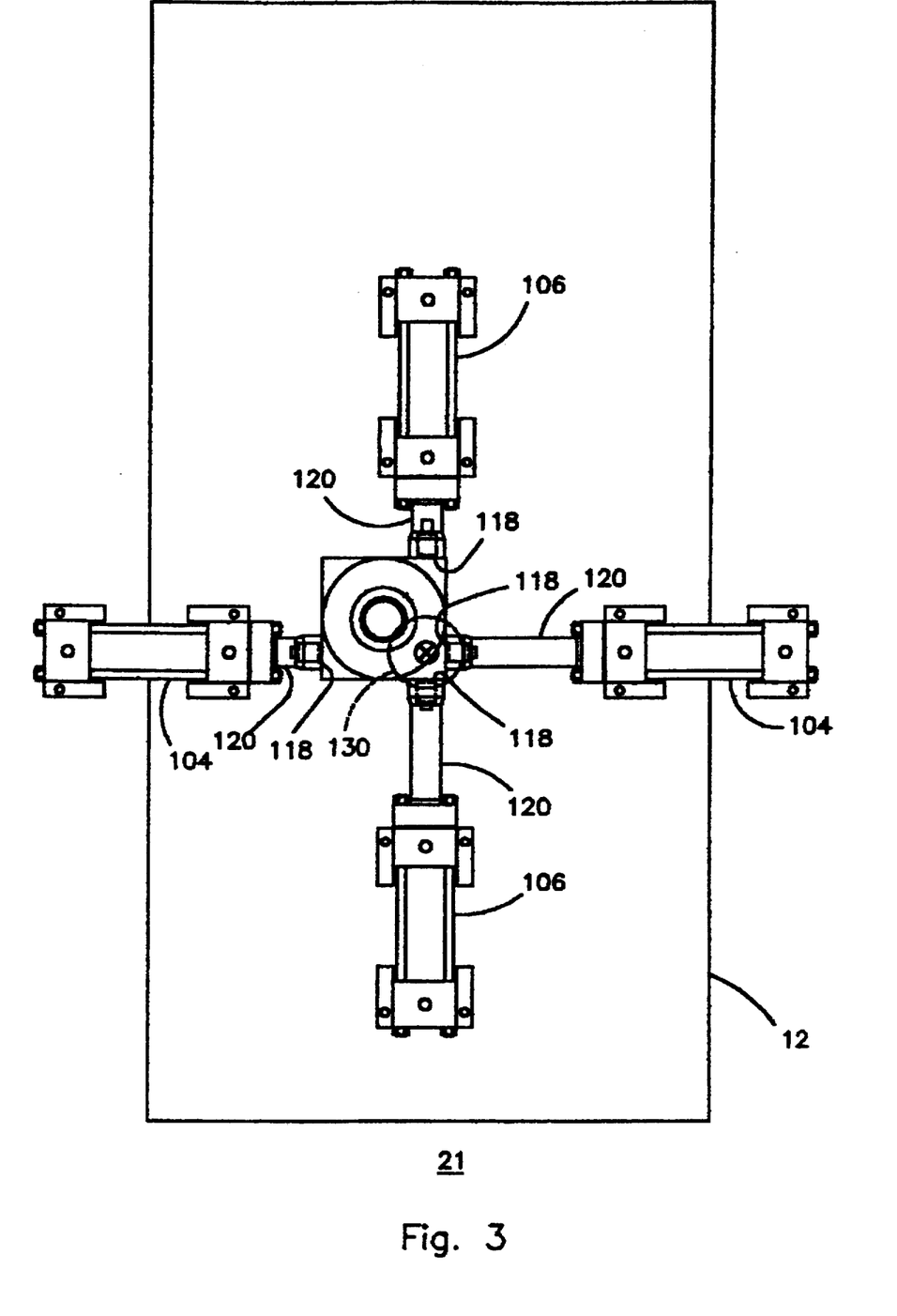
FIG. 3 is a top view of a section of the invention of FIG. 1, taken along the line B—B at time T2.

Referring now to FIG. 2, in S-wave operation, the hydraulic controller 96 controls the timing and manner of actuation of the control circuits 100 and 102. The control circuits 100 and 102 generate S-wave energy (either S1-waves or S2-waves, or both) by actuating cylinder pairs 104 and 106. The two actuating cylinder pairs 104 and 106 remain in contact with the socket 72. The actuating cylinder pair 104 activates S1 oscillatory vibration and the actuating cylinder pair 106 activates S2 oscillatory vibration. S1 and S2 servo valves 126 and 128, respectively, control the actuation of the respective actuating cylinder pairs 104 and 106. The hydraulic controller 96 controls the flow of hydraulic fluid from the S1 and S2 servo valves 126 and 128 to maintain those valves in a relationship which is 90 degrees out of phase with each other, thus imparting oscillatory vibrations in the bottom end 43. The oscillatory vibrations follow the circular path 130, as depicted in FIGS. 2 and 3, and have an axis which is substantially perpendicular to the baseplate 12, and collinear with the center 65 of the ball 44. The S-wave energy thus generated transfers into the actuating cylinders of the actuating cylinder pair 104 or 106, into the baseplate 12, and then into the Earth's surface 22.

Referring to FIG. 3, the dynamic progression of the control mechanism 21 is depicted, filustrating the position of the ends 118 on the baseplate 12 at a time T2. The control mechanism 21 imparts a substantially circular motion of the bottom end 43 of the piston shaft 34, such that the bottom end of the piston shaft follows a circular path 130 (compare with its position in FIG. 2 at time T1).

Figure 4:
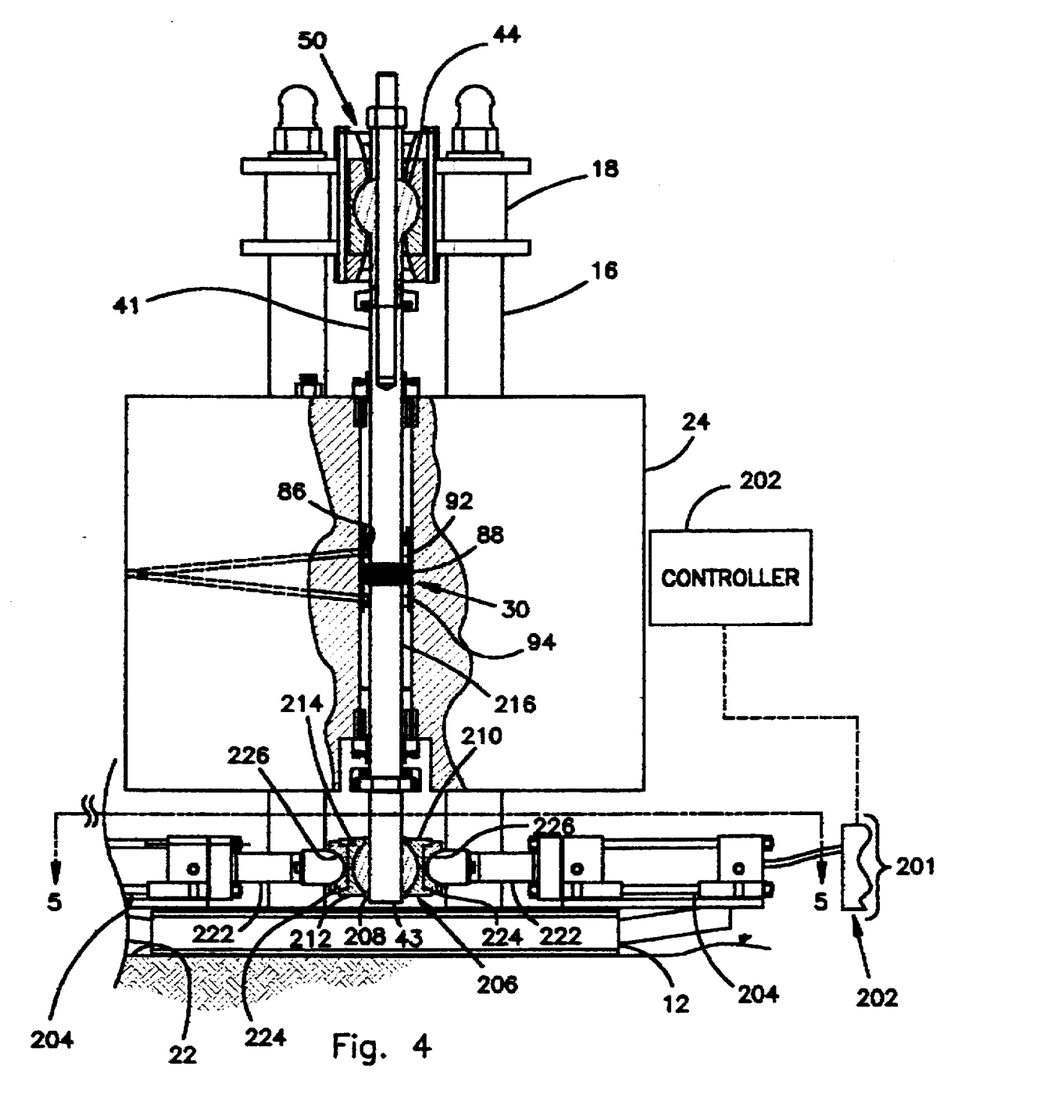
FIG. 4 is a side view of an alternate embodiment of the present invention.
Figure 5:
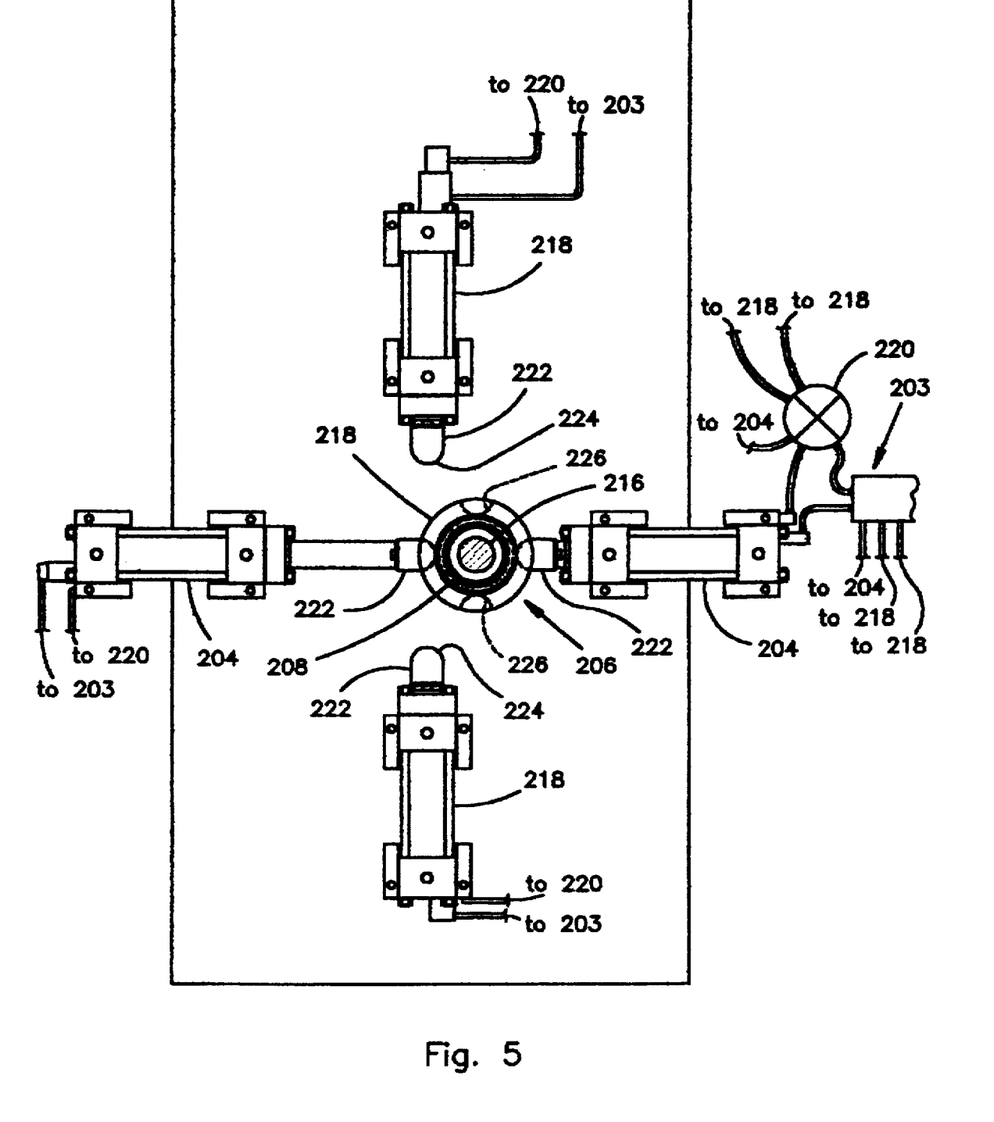
FIG. 5 is a top view of a section of the invention of FIG. 4, taken along the line A—A.

Referring to FIG. 4, a second alternate embodiment of the present invention generates simultaneous P-waves and either S1- or S2-waves. In this embodiment, the control circuit 80, depicted in FIG. 1, provides hydraulic pressure to the upper and lower compartments 92 and 94 on either side of the piston 88. A control mechanism 201 includes a hydraulic controller 202, a servo-hydraulic control circuit 203, and a yoke assembly 206. The control circuit 203 provides hydraulic pressure to the driving side of a piston (not shown) enclosed within a selected cylinder of two actuating cylinders 204. The actuating cylinders 204 are opposed, horizontally-mounted, and single-acting. The actuating cylinders 204 mount to the baseplate 12, and engage the yoke assembly 206. The yoke assembly 206 includes a ball 208, which a socket 209 holds, as shown in FIG. 5. The socket 209 includes a top yoke portion 210 and a bottom yoke portion 212. Fasteners 214 join the portions 210 and 212 together around the ball 208. The bottom end 43 of a piston shaft 216 slides within an opening of the ball 208. The actuating cylinders 204 engage, non-slidingly, the yoke assembly 206, and thus also the bottom end 43 of the piston shaft 216.

Referring now to FIG. 5, the servo-hydraulic control circuit 203 includes two opposed, horizontally-mounted, single-acting, servo-hydraulic, actuating pairs of cylinders 204 and 218 which mount to the baseplate 12 in an orthogonal relationship. The control circuit 203 includes a switching valve 220 which is capable of selectively controlling and actuating one pair of actuating cylinders at a time (for example, actuating cylinder pair 204, as depicted in FIG. 5).

The cylinders 204 and 218 include rod ends 222, each rod end having a spherical surface 224. The spherical surfaces 224 engage spherical recesses 226 on the yoke assembly 206.

In S-wave operation, the control circuit 203 selectively controls and actuates one pair of cylinders at a time (for example, cylinder pair 204, as depicted in FIG. 5). Thus, at any given time, the selected cylinder pair engages the recesses 226, while the non-selected pair does not.

In order to remain in contact during operation, the servo-hydraulic control circuit 203 exerts pressure on the driving side of the piston (not shown) within each cylinder of the actuating cylinder pair 204 or 218, of an amount greater than the pressure on the retract side, and sufficient to compensate for inertial and other dynamic forces which would otherwise tend to disengage the spherical surfaces 224 from the spherical recesses 226, when driving the yoke assembly 206.

When the selected actuating cylinder pair 204 or 218 reciprocates the yoke assembly 206, the yoke assembly reciprocates along a linear path, while the ball 208 pivots with the piston shaft 216. Because the reaction mass 24 mounts over the piston shaft 216, and the piston shaft engages the socket 209, the selected actuating cylinder pair is able to oscillate the reaction mass 24. This motion generates an oscillatory vibration which transfers through the engaged actuating cylinder pair, into the baseplate 12, and then into the Earth's surface 22.

Figure 6:
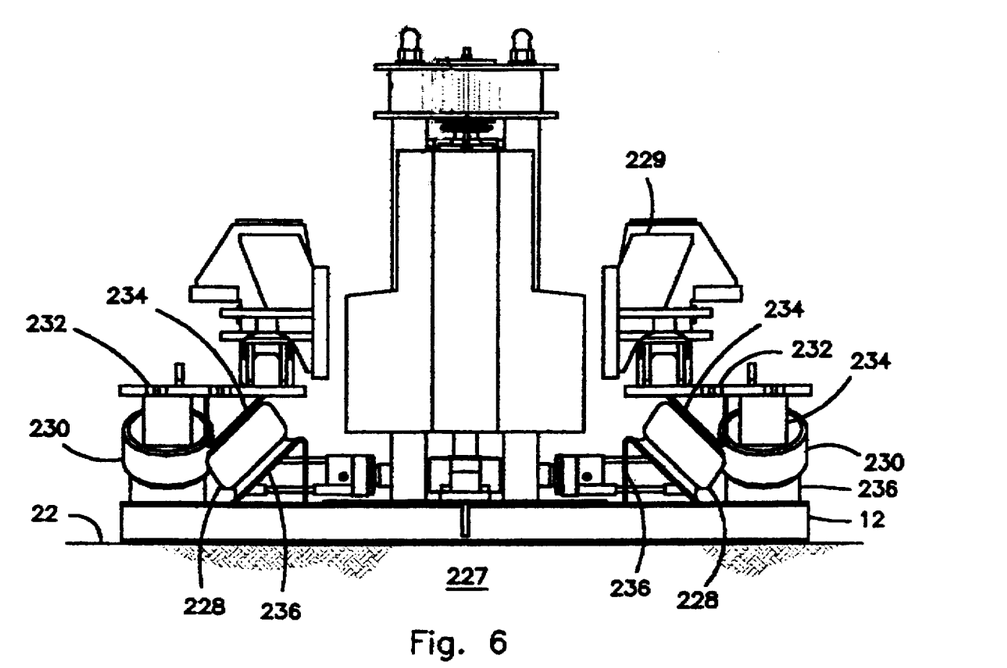
FIG. 6 is a side view of the vibration isolation support of the present invention.
Figure 7:
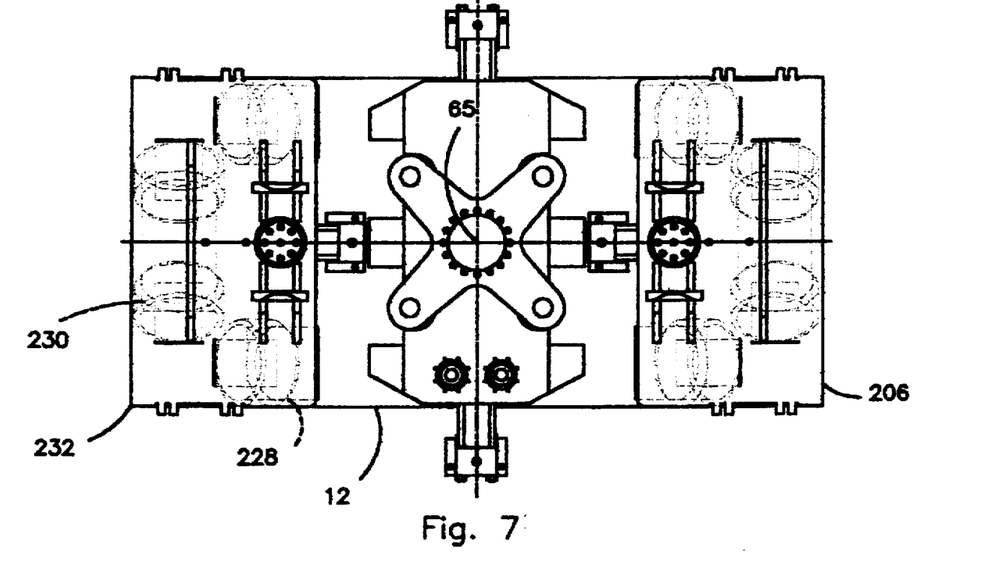
FIG. 7 is a top view of the vibration isolation support of the present invention.

Referring now to FIG. 6, a vibration isolation support 227 isolates the seismic vibrator from a vehicle frame 229. Air bags 228 and 230 mount between angle brackets 234 and 236. Each angle bracket 234 mounts to a foot 232. Each angle bracket 236 mounts to the baseplate 12. The angle brackets 234 and 236 incline the air bags 228 and 230 at about 45 degrees. As depicted in FIG. 7, the air bags 228 and 230 contain air held at substantially the same pressure, and are symmetrically spaced. In the preferred embodiment, depicted in FIGS. 6 and 7, two pairs of air bags 228, with opposing axes, incline in the transverse vertical plane, and two pairs of air bags 230, with opposing axes, incline in the longitudinal plane. The air bags 228 and 230 are pressurized via air valve stems (not shown), in a manner similar to that of a standard automotive tire.

In operation, the air bags 228 and 230 provide substantially non-axis-specific support for the seismic vibrator 10. Axis-specific support can be gained, if desired, by controlling the pressure of the gas in the air bags 228 and 230.

The present invention includes a method, described above in the description of the embodiments and operation of the seismic vibrator 10, which imparts combined compressional and shear wave seismic vibrations into the Earth's surface 22. The method includes the steps of (a) creating substantially vertical vibrations in a reaction mass 24; (b) creating substantially horizontal, oscillatory vibrations of the reaction mass; and (c) transmitting the vibrations into the Earth's surface 22.

An advantage achieved with the present invention is that it enables the generation of all three seismic waves in one setup, thus eliminating the need to reconfigure the seismic vibrator each time another of the three types of seismic waves is required.

Another advantage achieved with the present invention is that it enables the selection of the type of seismic wave which transfers into the Earth's surface.

A still further advantage achieved with the present invention is that a technician may tailor vibration isolation parameters to suit the terrain surrounding the seismic vibrator.

Several variations may be made in the foregoing without departing from the scope of the invention. For example, a single, double-acting, hydraulic cylinder which horizontally-mounts to the baseplate 12, and pivotally-connects to the bottom end 43 may substitute for a single-acting servo-hydraulic actuating cylinder pair (e.g. 104) without substantially affecting the function of the device.

Further, although it is preferred that the present invention mount to a vehicle, and that it facilitate seismic wave generation for seismic exploration, the system of the present invention is not limited to the seismic exploration environment discussed above, but rather can adapt for use in other applications requiring the simultaneous generation of vibrational waves.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A seismic vibrator, which selectively imparts compressional and shear wave seismic vibrations into the Earth's surface, comprising:
   a. an earth-contacting baseplate which transmits vibrational energy into the Earth's surface;
   b. a support structure having a pivot assembly connected to it;
   c. stilt legs rigidly connecting the baseplate and the support structure in a spaced relationship;
   d. a vibrator assembly having a first and second end connected by a middle portion, the vibrator assembly being pivotally supported at its first end by the pivot assembly, and including a reaction mass centered on a vibrational axis;
   e. first and second control means, the first control means activating a reciprocal vibration of the reaction mass along the substantially vertical vibratory axis of the vibrator assembly when the seismic vibrator is in an operational position, and the second control means activating a first oscillatory vibration of the second end of the vibrator assembly, whereby vibrations are transferred to the baseplate and injected into the Earth's surface.

2. The seismic vibrator of claim 1 further comprising a third control means which activates a second oscillatory vibration of the second end of the vibrator assembly substantially orthogonal to that of the first oscillatory vibration.

3. The seismic vibrator of claim 1, wherein the second control means includes at least one actuator which is in mating, non-sliding engagement with the second end of the vibrator assembly.

4. The seismic vibrator of claim 1, wherein the second control means imparts sustained oscillatory vibration to the second end of the vibrator assembly along a substantially circular path having an axis which is substantially collinear with the Earth's center and the center of the ball when the seismic vibrator is in a preferred operational position.

5. The seismic vibrator of claim 2, wherein the second and third control means work together to impart sustained oscillatory vibration to the second end of the vibrator assembly along a substantially circular path having an axis which is substantially collinear with the Earth's center and the center of the ball when the seismic vibrator is in a preferred operational position.

6. The seismic vibrator of claim 1, wherein the second control means is comprised of the selective actuation of opposed actuating cylinders.

7. The seismic vibrator of claim 2, wherein the second and third control means selectively actuate two substantially opposed, actuating cylinder pairs, each pair being positioned substantially orthogonally with respect to the other pair.

8. The seismic vibrator of claim 5, wherein the second and third control means selectively actuate two, substantially opposed, actuating cylinder pairs, each pair being positioned substantially orthogonally with respect to the other pair.

9. The seismic vibrator of claim 8, further comprising a yoke assembly pivotally attached to the second end of the vibrator assembly, wherein the yoke assembly includes an outer prismatic housing and an inner ball which mounts onto the piston shaft of the vibration assembly, wherein further, the outer prismatic housing and the rod ends of the actuating cylinders have corresponding, matable, sliding surfaces which remain engaged with the prismatic housing during operation of the seismic vibrator.

10. A seismic vibrator, which imparts combined compressional and shear wave seismic vibrations into the Earth's surface, comprising:
   a. an earth-contacting baseplate which transmits vibrational energy into the Earth's surface;
   b. a support structure having a pivot assembly connected to it;
   c. stilt legs rigidly connecting the baseplate and the support structure in a spaced relationship;
   d. a vibrator assembly having a first and second end connected by a middle portion, the vibrator assembly being pivotally supported at its first end by the pivot assembly, and including a reaction mass centered upon a substantially vertical vibratory axis;
   e. control means comprising a first control circuit activating reciprocal vibration of the reaction mass along the vibratory axis of the vibrator assembly, and a second control circuit oscillating the second end of the vibrator assembly along a substantially circular path having an axis substantially collinear with the Earth's center and the center of the ball when the seismic vibrator is in a preferred operational position, and whereby the control means activates vibrations which are transferred to the baseplate and injected into the Earth's surface.

11. A method for imparting combined compressional and shear wave seismic vibrations into the Earth's surface, comprising the steps of:

a. creating substantially vertical vibrations by reciprocally vibrating a reaction mass along a shaft having a first and second end, the first end suspended from a ball mounted on a support structure, the shaft extending from the ball toward an earth-contacting baseplate, wherein stilt legs rigidly mount to and extend between the support structure and the baseplate, such that the baseplate and the support structure are maintained in a space relationship;

b. creating substantially horizontal, oscillatory vibrations of the reaction mass by controllingly activating the second end of the shaft to oscillate the reaction mass; and c. transmitting the vibrations into the Earth's surface.

12. The method of claim 11 wherein the oscillatory vibrations are created by actuating cylinders which activate a first and second oscillatory vibration of the second end of the shaft, the first and second oscillatory vibrations being substantially orthogonal to each other.

* * * * *

UNITED STATES PATENT AND TRADEMARK OFFICE
CERTIFICATE OF CORRECTION

PATENT NO. : 5,666,328
DATED : September 9, 1997
INVENTOR(s) : John Mark Crowell et al.

It is certified that error appears in the above-identified patent and that said Letters Patent is hereby corrected as shown below:

Column 1, line 19, "seismi c" should read --seismic--.
Column 2, line 30, "ands" should read --axis--.
Column 2, line 44, "oscfilatory" should read --oscillatory--.
Column 3, line 5, "oscfilatory" should read --oscillatory--.
Column 5, line 51, "filustrating" should read --illustrating--.

Signed and Sealed this

Tenth Day of March, 1998

Attest:

BRUCE LEHMAN

Attesting Officer

Commissioner of Patents and Trademarks